Figure 1:
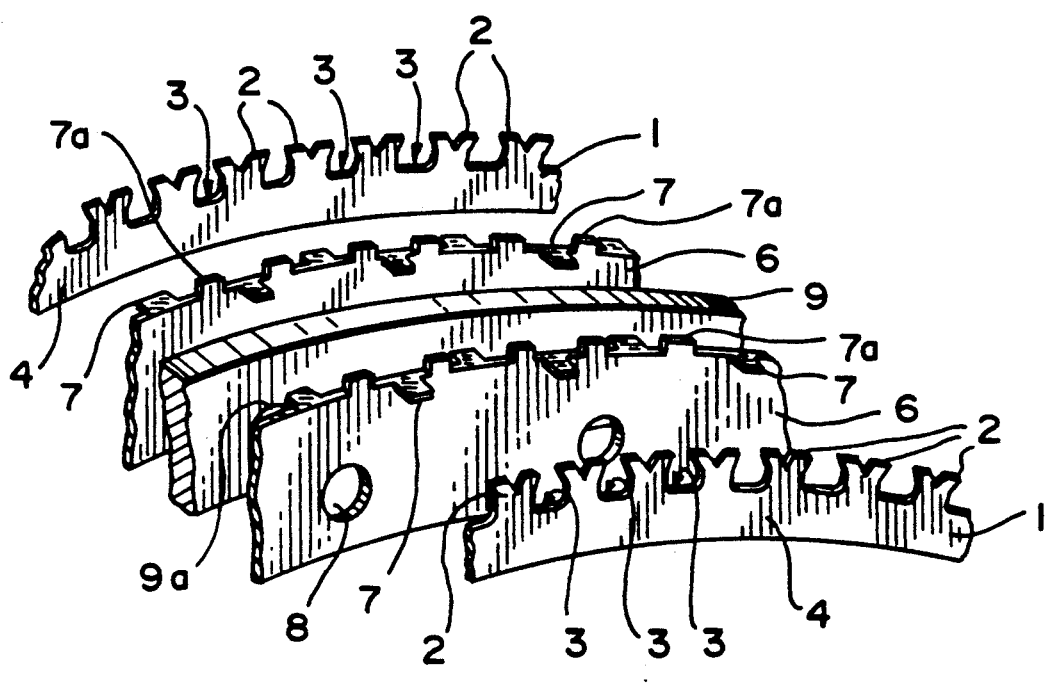

United States Patent [19]

Larin

[11] Patent Number: 5,206,977
[45] Date of Patent: May 4, 1993

[54] CONSTRUCTIVE ARRANGEMENT OF TIRE RASPING SEPARATOR AND SAW ASSEMBLY

[76] Inventor: Hector O. Larin, 354-km 63, Estr. Estado de Sao Paulo, Brazil

[21] Appl. No.: 708,601

[22] Filed: May 31, 1991

[30] Foreign Application Priority Data

May 31, 1990 [BR] Brazil .................. PI9002650

[51] Int. Cl.⁵ .................................................. B23D 71/02
[52] U.S. Cl. ................................................ 29/79; 407/31
[58] Field of Search ............. 407/31; 29/78–80; 83/664, 665, 951; 157/13; 241/278.1; 76/116

[56] References Cited

U.S. PATENT DOCUMENTS

| | | | |
|---|---|---|---|
| 3,528,153 | 9/1970 | Walter | 29/79 |
| 3,618,187 | 11/1971 | Jensen | 29/79 |
| 3,879,825 | 4/1975 | Jensen et al. | 29/79 |
| 4,019,234 | 4/1977 | Jensen et al. | 29/79 |

*Primary Examiner*—Steven C. Bishop
*Attorney, Agent, or Firm*—Welsh & Katz, Ltd.

[57] ABSTRACT

There is disclosed a saw blade mounting assembly of this invention for a tire rasping apparatus, which comprises at least one rotatable cap and a plurality of pins extending orthogonally from the cap to receive the saw blade mounting assembly thereon. The saw blade mounting assembly comprises at least one saw blade, a spacing member and at least one retaining blade. The saw blade has an inner smooth edge, an outer edge and a plurality of bores disposed therealong in alignment to receive corresponding ones of the plurality of the pins. The outer edge of the saw blade has a plurality of cutouts evenly spaced therealong and extending towards the inner edge to form a plurality of teeth. Each tooth is formed between successive cutouts. The spacing member has a plurality of bores disposed therealong in alignment to receive corresponding ones of the plurality of the pins. At least one retaining blade has inner and outer edges, opposing side surfaces, a plurality of bores disposed therealong in alignment to receive corresponding ones of the plurality of the pins and a plurality of attachment pawls. The attachment pawls extend from the opposing side surfaces and are spaced along the retaining blade in alignment with corresponding ones of said plurality of cutouts. The retaining blade, saw blade and spacing member are assembled together such that the bores of the spacing member and the retaining blade are mounted on the pins, and one of the opposing side surfaces of the retaining blade abuts the saw blade and each of the plurality of attachment pawls extend through and engages a corresponding one of the cutouts, whereby the saw blade is secured to the rotatable cap.

8 Claims, 2 Drawing Sheets

CONSTRUCTIVE ARRANGEMENT OF TIRE RASPING SEPARATOR AND SAW ASSEMBLY

The present invention refers to a constructive arrangement of a tire rasping separator and saw assembly of the type employed in the recapping industry of similar ones. The assembly of the present invention is particularly lighter and less expensive than the conventional ones.

As known by the persons skilled in the art, rasping and recapping of tires and the like are currently carried out by using a rasping wheel formed by a plurality of saws and their respective separators. Each set of saws comprises four arched blades, whose edge is convex an provided with a number of teeth. Each blade includes along its longitudinal arched length a plurality of bores for mounting the blase next to a basic wheel having orthogonal passing pins. The separator is arranged between two adjacent saws and has the same longitudinal arched shape as that of the saw. The separator is usually defined by a stamped or cast metallic plate having a desired thickness and including corresponding longitudinal passing bores which align themselves with the bores of the saw during mounting of the rasping wheel so that the passing pins of the basic wheel simultaneously pass through an alignment of saw bores and their respective separators arranged in alternate groups.

Although the above described constructive arrangement has satisfactorily functioned during the rasping process, rasping wheels so formed are relatively expensive and heavy as a whole.

These two disadvantages are closely related to the construction of the saw blade. Because of the relatively large width required for the blades, their manufacture result in a great material consumption thereby raising the costs of production and replacement of the blades at the end of their useful life.

Since the part of the saw blades, which is subject to wear, is limited to the convex end edge having cutting teeth, it becomes evident that the material waste is so much greater because the rate of scrapping material in relation to the material indeed used is disproportionate.

Another disadvantage of conventional saw blades relates to the excessive weight of the rasping wheel as a whole.

As an attempt to reduce the rasping wheel weight and also its cost of production and maintenance, the applicant for the present application has previously introduced improvements to the rasping wheel separator and saw assembly, which are described in his Brazilian Patent No. PI 8701616 filed on Apr. 7, 1987.

The improvements described and claimed by the mentioned patent comprise providing the inner edge of the saws with various semicircular cutouts thereby reducing by half the width of the saw. The saw further includes at its lateral side several interfering attachment pawls spaced between them and mounted to one rim made in the outer edge of the respective separator. The separator is provided with several stamped shoulders in order to allow perfect adjustment of the assembly.

The above-mentioned improvements introduced into the rasping wheel separator and saw assembly provide a considerable reduction in weight and manufacturing costs as a result of the reduction of the material used for the manufacture of the saw blades. However, stamping and obtaining the cutouts have caused the process to become somewhat complex and to obtain satisfactory results when mounting the rasping wheel requires an accurate quality control.

New studies and research have the aim of improving the parts of the rasping wheel by making the parts lighter and less costly when compared to those parts resulting from the improvements obtained by Brazilian Patent No. PI 8701616 of applicant.

Therefore it is one objective of the present invention to provide an arrangement for a tire rasping separator and saw assembly, which is lighter in weight and without negatively effecting the performance of the rasping wheel as a whole.

Another objective of the present invention is to provide a constructive arrangement for a tire rasping separator and saw assembly capable of allowing the manufacture of parts from wedge bimetallic material or from usual materials, thereby assuring a greater diversification during production of the pieces.

These and other objectives and advantages of the present invention are achieved by a saw blade mounting assembly of this invention for a tire rasping apparatus, which comprises at least one rotatable cap and a plurality of pins extending orthogonally from the cap to receive the saw blade mounting assembly thereon. The saw blade mounting assembly comprises at least one saw blade, a spacing member and at least one retaining blade. The saw blade has an inner smooth edge, an outer edge and a plurality of bores disposed therealong in alignment to receive corresponding ones of the plurality of the pins. The outer edge of the saw blade has a plurality of cutouts evenly spaced therealong and extending towards the inner edge to form a plurality of teeth. Each tooth is formed between successive cutouts. The spacing member has a plurality of bores disposed therealong in alignment to receive corresponding ones of the plurality of the pins. The retaining blade has inner and outer edges, opposing side surfaces, a plurality of bores disposed therealong in alignment to receive corresponding ones of the plurality of the pins and a plurality of attachment pawls. The attachment pawls extend from the opposing side surfaces and are spaced along the retaining blade in alignment with corresponding ones of said plurality of cutouts. The retaining blade, saw blade and spacing member are assembled together such that the bores of the spacing member and the retaining blade are mounted on the pins, and one of the opposing side surfaces of the retaining blade abuts the saw blade and each of the plurality of attachment pawls extends through and engages a corresponding one of the cutouts, whereby the saw blade is secured to the rotatable cap.

Figure 2:
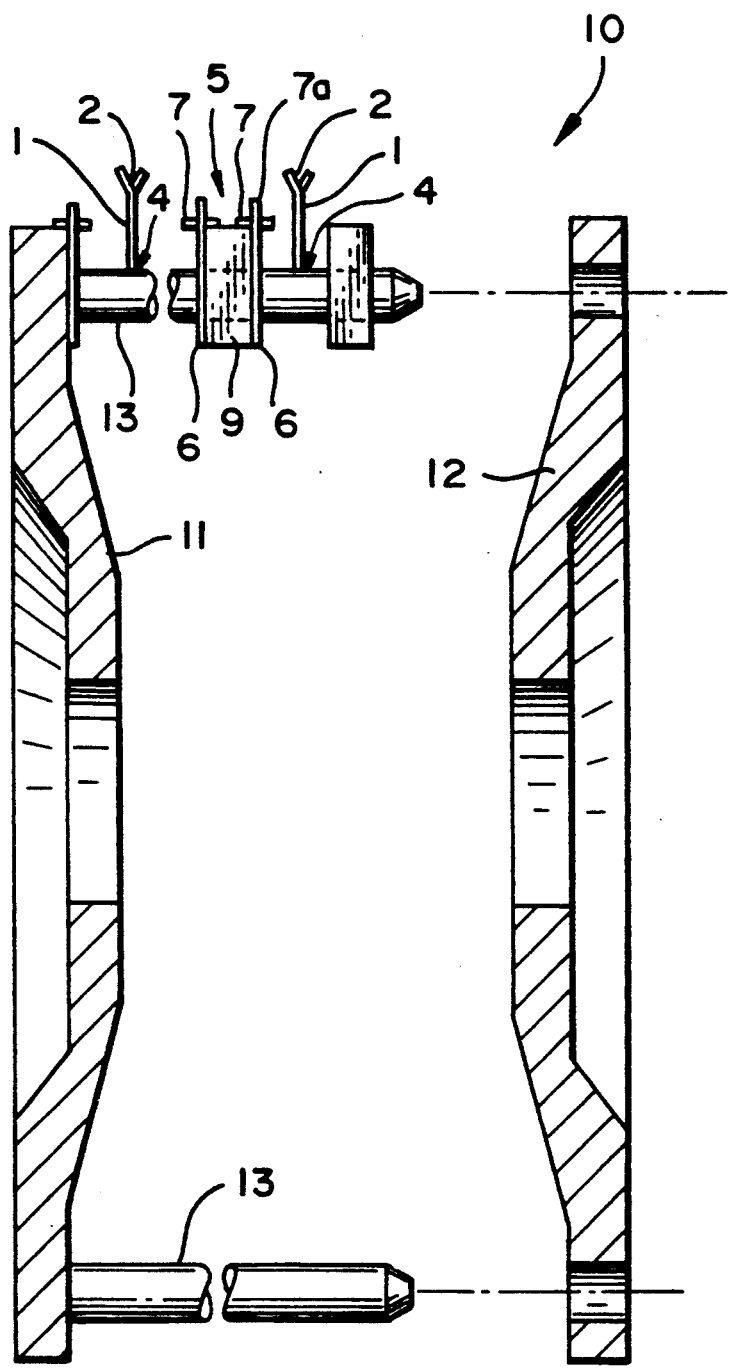

The present invention is now hereinbelow described with reference to the attached drawings in which:

FIG. 1 is a partial exploded perspective view of the rasping wheel separator and saw assembly to illustrate the mounting arrangement of the rasping wheel; and FIG. 2 is an exploded lateral view of the rasping wheel of FIG. 1 to illustrate the relative position of the saw blades and separators.

According to the drawings, the constructive arrangement of the tire rasping separator and saw assembly of the present invention includes, as shown in FIG. 2, a rasping wheel 10 comprising two caps 11 and 12. Cap 11 has at its inner face a plurality of orthogonal pins 13, which are disposed in a spaced and parallel relationship with each other and with a central axis (shown by a dashed-dot line in FIG. 2) of the rasping wheel 10. The orthogonal pins 13 support a plurality of saw blades 1 mounted thereon. The saw blades 1 are fastened by means of separators 5, which comprise stamped or cast retaining blades 6 and a spacing or stuffing member 9, which is disposed between the blades 6 and has a determined thickness. The separators 5 are best shown in FIG. 2 as having passing bores 8 through which the orthogonal pins 13 pass. The spacing member 9 also includes bores 9a spaced to receive the pins 13.

Each saw blade 1, which is obtained from a linear band, has an arched shape with small width. At the convex outer edge of the blade 1, there is disposed a plurality of cutting teeth 2 with a stylized Y-shape. The teeth 2 are spaced between corresponding ones of a plurality of U-shaped cutouts 3. Each saw blade 1 has a concave inner edge 4, which is fully smooth.

Preferably an annular alignment of saw blades 1 is formed by four arched blades 1 each of them having thirteen cutting teeth 2.

As shown in FIG. 2, each separator 5 is formed by two retaining blades 6 and the spacing or stuffing member 9 disposed therebetween. Each retaining blade 6 comprises an arched, thin plate of a width approximately equal to twice that of the saw blades 1. There is disposed at the convex outer edge of each of the blades 6 a sequence of attachment spaced pawls 7. The attachment pawls 7 are spaced from each other to be aligned with the cutouts 3 of the saw blade 1. The attachment pawls 7 are folded to lie orthogonally with respect to the remainder of the blades 6 and are interposed between rectangularly shaped, upwardly extending projections 7a. The attachment pawls 7 face alternately to one side and the other, but lie in a common plain.

In the middle part of the retaining blade 6 as shown in FIG. 1, there is defined a plurality of the passing bores 8 through which orthogonal pins 13 are passed during mounting of the rasping wheel 10.

The spacing or stuffing member 9 is defined by an arched body having a vertically disposed width, which is approximately equivalent to that of each of the retaining blades 6 and a considerable thickness so as to separate the attachment pawls 7 of the two retaining blades 6 placed on either side of the spacing member 9.

The spacing member 9 includes at its middle part a plurality of the passing bores 9a, each of which is aligned with a corresponding one of the passing bores 8 of the retaining blades 6 to allow the simultaneous insertion of the respective orthogonal pins 13 of the rasping wheel 10.

Therefore, according to FIGS. 1 and 2, mounting of the rasping wheel 10 is carried out by first mounting one of the retaining blade 6 on its respective orthogonal pins 13. Next, saw blade 1 is mounted on the orthogonal pins so that attachment pawls 7 are alternately aligned with corresponding U-shaped cutouts 3 of the saw blade 1, whose bottom edge 4 is also disposed over the orthogonal pins 13 of the wheel 10.

By this method, all of the rectangular projections 7a of each retaining blade 6 are placed against the respective face of its corresponding saw blade 1 and are aligned with the cutting teeth 2 of the corresponding saw blade 1.

As a next step, the separator 5 is mounted on the orthogonal pins 13 adjacent to a prior mounted saw blade whereby the alternate attachment pawls 7 of the mounted retaining blade 6 are aligned with and engage the U-shaped cutouts 3 of the adjacent saw blade 1.

A plurality of saw blades 1 and separators 5 may be mounted until the length of the orthogonal pins 13 is completely filled. FIG. 2 shows the sequence a single separator 5 and pair of saw blades 1. The free ends of the orthogonal pins 13 are passed through and fastened to the opposite cap 12 thereby finishing the mounting of the rasping wheel 10. The attachment pawls 7 of successive retaining blades are dephased with respect to each other, whereby one saw blade 1 is axially retained by two adjacent retaining blades 6.

Similarly, the rectangular support projections 7a of adjacent retaining blades 6 abut the opposite faces of the cutting teeth 2 of one saw blade 1 thereby assuring resistance and bilateral support of the saw blade 1.

It should be noted that the manufacture of the saw blade 1 from a linear band allows for execution of any arched shape.

Even though the present description includes and illustrates a preferred configuration of the separator and saw assembly, it is evident that structural modifications are possible without departing from the purpose of the present invention.

I claim:

1. A saw blade mounting assembly for a tire rasping apparatus, the tire rasping apparatus comprising at least one rotatable cap and a plurality of pins extending orthogonally from the cap to receive said saw blade mounting assembly thereon, said saw blade mounting assembly comprising:
   a) at least one saw blade having an inner smooth edge, an outer edge and a plurality of bores disposed along said saw blade in alignment to receive corresponding ones of the plurality of the pins, said outer edge having a plurality of cutouts evenly spaced therealong and extending towards said inner edge to form a plurality of teeth, each tooth formed between successive cutouts;
   b) a spacing member having a plurality of bores disposed along said spacing member in alignment to receive corresponding ones of the plurality of the pins; and
   c) at least one retaining blade having inner and outer edges, opposing side surfaces, a plurality of bores disposed along said retaining blade in alignment to receive corresponding ones of the plurality of the pins and a plurality of attachment pawls, said attachment pawls extending from said opposing side surfaces and spaced along said retaining blade in alignment with corresponding ones of said plurality of cutouts;
   d) said retaining blade, said saw blade and said spacing member being assembled together such that said bores of said spacing member and said retaining blade are mounted on the pins, and one of said opposing side surfaces of said retaining blade abuts said saw blade and each of said plurality of attachment pawls extends through and engages a corresponding one of said plurality of cutouts, whereby said saw blade is secured to the rotatable cap.

2. The saw blade mounting assembly as claimed in claim 1, wherein said saw blade and said spacing member have respectively first and second dimensions between their inner and outer edges, said first dimension being less than said second dimension.

3. The saw blade mounting assembly as claimed in claim 2, wherein said first dimension is equal to substantially one-half of said second dimension.

4. The saw blade mounting assembly as claimed in claim 1, wherein alternate ones of said plurality of said attachments pawls extend from said opposing side surfaces in opposite directions.

5. The saw blade mounting assembly as claimed in claim 4, wherein there is included a pair of said retaining blades disposed on either side of said saw blade and engaging said opposing side surfaces thereof, said attachment pawls of said pair of retaining blades engaging and retaining alternate cutouts of said saw blade.

6. A saw blade mounting assembly as claimed in claim 1, wherein said retaining blade comprises a plurality of support projections spaced evenly along said retaining blade and extending from said outer edge and away from said inner edge of said retaining blade.

7. A saw blade mounting assembly as claimed in claim 6, wherein each of said plurality of support projections is disposed between adjacent ones of said plurality of attachment pawls.

8. A saw blade mounting assembly as claimed in claim 7, wherein there is included a pair of said retaining blades disposed on either side and abutting said opposing side surfaces of said saw blade, said attachment pawls of said pair of retaining blades extending through and engaging alternate ones of said plurality of cutouts and said support projections of said pair of retaining blades engaging and supporting said opposing side surfaces of each of said plurality of teeth.

* * * * *